United States Patent
Hilton et al.

(10) Patent No.: US 12,465,306 B2
(45) Date of Patent: Nov. 11, 2025

(54) SYSTEMS AND METHODS FOR STABILIZING DIGITAL RADIOGRAPHIC IMAGING

(71) Applicant: QSA Global Inc., Burlington, MA (US)

(72) Inventors: Robert R. Hilton, Houston, TX (US); Ryan Trulli, Billerica, MA (US); Arnold Lin, Natick, MA (US)

(73) Assignee: QSA GLOBAL INC., Burlington, MA (US)

( * ) Notice: Subject to any disclaimer, the term of this patent is extended or adjusted under 35 U.S.C. 154(b) by 182 days.

(21) Appl. No.: 18/506,655

(22) Filed: Nov. 10, 2023

(65) Prior Publication Data
US 2025/0152117 A1    May 15, 2025

(51) Int. Cl.
*A61B 6/00*    (2024.01)
(52) U.S. Cl.
CPC .................... *A61B 6/4429* (2013.01)
(58) Field of Classification Search
CPC .............................. A61B 6/4429; G01N 23/00
See application file for complete search history.

(56) References Cited

U.S. PATENT DOCUMENTS

| | | | | |
|---|---|---|---|---|
| 1,423,924 A * | 7/1922 | Edwards | ............... | A61B 6/4429 248/592 |
| 6,431,751 B1 * | 8/2002 | Everett | ................ | A61B 6/4233 378/197 |
| 2023/0255579 A1 * | 8/2023 | Gabella | ................ | A61B 6/4441 378/62 |

* cited by examiner

*Primary Examiner* — Kiho Kim
(74) *Attorney, Agent, or Firm* — McAndrews, Held & Malloy, Ltd.

(57) ABSTRACT

Example radiography image stabilizers include: an attachment bracket configured to be coupled to a center section of a radiographic imaging device and to extend from the center section of the imaging device in a first direction different than a direction in which the imaging device is configured to direct radiation; two or more legs attached to the attachment bracket and configured to extend from the bracket at least partially in the directions in which the center section of the imaging device extends from an attachment point with the bracket; and three or more low-friction contact surfaces collectively coupled to the two or more legs, such that at least one contact surface is disposed on each side of the center section, wherein the legs include pivot points and leg sections to selectively adjust a height of the bracket with respect to the contact surfaces and a width between the contact surfaces.

15 Claims, 13 Drawing Sheets

SYSTEMS AND METHODS FOR STABILIZING DIGITAL RADIOGRAPHIC IMAGING

FIELD OF THE DISCLOSURE

This disclosure relates generally to radiography and, more particularly, to systems and methods for stabilizing digital radiographic imaging.

BACKGROUND

Conventional C-arm radiography is performed using a hand-carried or suspended radiography device, which includes a radiation emitter and a radiation detector. One such hand-carried or suspended radiography device is disclosed in U.S. Pat. No. 10,874,362. The entirety of U.S. Pat. No. 10,874,362 is incorporated herein by reference.

While the radiography devices disclosed in the '362 patent represent significant improvements in portability of radiographic devices, hand-carried radiography devices may be susceptible to instability of the resulting radiographic imaging and/or video. Additionally, while the radiography devices disclosed in the '362 are capable of being suspended from an overhead system, such systems are not available over every desired application, and may limit the orientations of the radiographic device while suspended.

SUMMARY

Systems and methods for stabilizing digital radiographic imaging are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
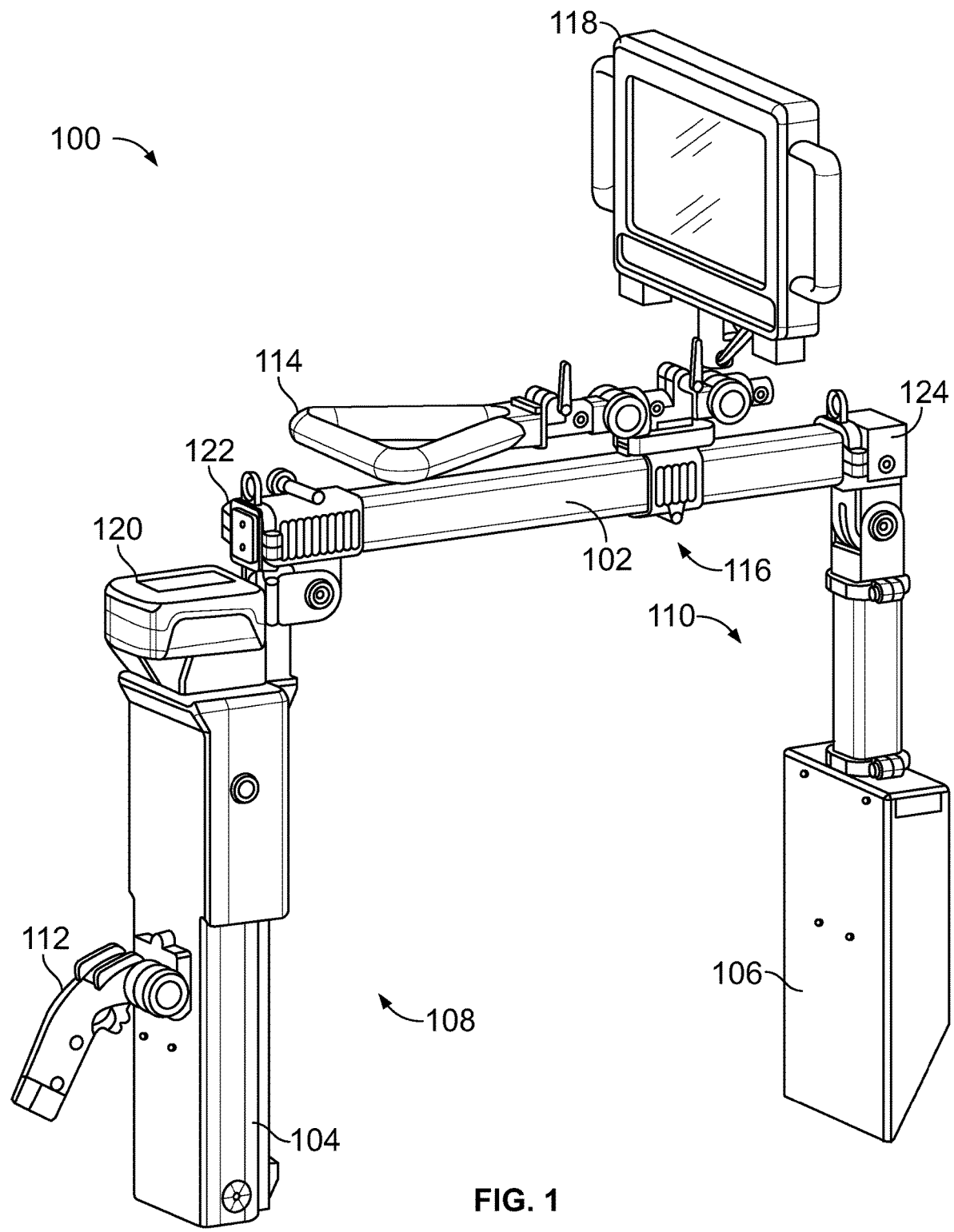
FIG. 1 is a perspective view of an example handheld X-ray imaging system to generate and output digital images and/or video based on incident X-rays, in accordance with aspects of this disclosure.

As mentioned above, handheld, C-arm digital radiography systems has substantially improved the ease of access and usability of radiography systems. Such radiography systems are often used to scan pipelines or pipe-under-insulation applications. Pipe-under-insulation scanning applications often involve moving the radiography system along a length of a pipe. While handheld, C-arm digital radiography systems are more easily handled by operators, image stability is often desired by those viewing or analyzing the output images and/or video, which can be difficult to achieve over lengths of pipe by a human operator carrying the device.

Disclosed systems and methods for stabilizing radiography involve attaching an image stabilizer to a digital radiography system, in which the image stabilizer is placed into contact with the object to be scanned. Such image stabilizers may be used, for example, in pipeline and/or pipe-under-insulation applications to more easily maintain a consistent height, angle, and/or travel speed over a length of pipe being scanned.

Some disclosed example radiography image stabilizers are attached to a central portion of a C-arm radiography system. The example radiography image stabilizers include two or more legs supporting the radiography system on three or more low-friction surfaces (e.g., wheels, casters, gliding surfaces, rollers, bearings, and/or any other surfaces which can roll or glide in one or more directions) to provide balance to the C-arm radiography system. In some examples, the two or more legs each include two or more pivotally coupled segments, which allow an operator to control both the width between the low-friction surfaces and the height of the attached radiography system with respect to the surface on which the image stabilizer is placed. Disclosed example image stabilizers provide image stabilization to digital radiography systems at least over a range of outer diameters (ODs) of pipe or pipe-under-insulation between 3 inches OD and 30 inches OD.

As used herein, the term "real-time" refers to the actual time elapsed in the performance of a computation by a computing device, the result of the computation being required for the continuation of a physical process (i.e., no significant delays are introduced). For example, real-time display of captured images includes processing captured image data and displaying the resulting output images to create the perception to a user that the images are displayed immediately upon capture. As used herein, the term "portable" includes handheld (e.g., capable of being carried and operated by a single person) and/or wheeled (e.g., capable of being transported and operated while wheels are attached and/or placed on wheels).

While example systems and methods are disclosed below with reference to X-rays, the disclosure is similarly applicable to other electromagnetic energy ranges. For example, other X-ray energies, gamma rays, and/or any other types of electromagnetic radiation may be used based on the application and using with the appropriate personnel techniques and/or equipment.

Disclosed example radiography image stabilizers include: an attachment bracket configured to be coupled to a center section of a radiographic imaging device and to extend from the center section of the radiographic imaging device in a first direction different than a direction in which the radiographic imaging device is configured to direct radiation; two or more legs attached to the attachment bracket and configured to extend from the attachment bracket at least partially in the directions in which the center section of the radiographic imaging device extends from an attachment point with the attachment bracket; and three or more low-friction contact surfaces collectively coupled to the two or more legs, such that at least one contact surface is disposed on each side of the center section, wherein each of the legs includes at least one pivot point and at least two leg sections coupled by the at least one pivot point to selectively adjust a height of the attachment bracket with respect to the contact surfaces and a width between the contact surfaces.

In some example radiography image stabilizers, the two or more legs are pivotally coupled to the attachment bracket. In some example radiography image stabilizers, the pivot point is securable to maintain the width between the low-friction contact surfaces and the height of the attachment bracket with respect to the low-friction contact surfaces. In some example radiography image stabilizers, the attachment bracket is configured to attach to a Picatinny rail.

In some example radiography image stabilizers, the three or more low-friction contact surfaces are coupled to the two or more legs via respective hubs attached to the legs. In some example radiography image stabilizers, the hubs are transverse to the direction in which the radiographic imaging device is configured to direct the radiation, to position the contact surfaces on both sides of the radiographic image device. In some example radiography image stabilizers, the hubs are configured to attach at least two different types of low-friction contact surfaces, wheels having at least two different sizes, or at least two different axle diameters.

Some example radiography image stabilizers include four or more low-friction contact surfaces, in which at least two low-friction contact surfaces of the four or more low-friction contact surfaces are on each side of the attachment bracket. In some example radiography image stabilizers, the two or more legs are configured to adjust a width between the low-friction contact surfaces to engage pipes between 3 inches and 30 inches in diameter. In some example radiography image stabilizers, at least one of the leg sections on each of the legs has an adjustable length. In some example radiography image stabilizers, the low-friction contact surfaces include at least one of wheels, casters, gliding surfaces, rollers, or bearings.

In some example radiography image stabilizers, the attachment bracket include a height suspension configured to bias the central section of the radiographic imaging device in a first direction with a suspension force. In some example radiography image stabilizers, first direction is away from the low-friction surfaces, and the suspension force may be overcome to push the central section towards the low-friction surfaces. Some example radiography image stabilizers, further include a height lock configured to lock a height of the central section with respect to the two or more legs.

In some example radiography image stabilizers, the attachment bracket is configured to hold the radiography device at a substantially constant distance from the object under inspection while moving the radiography device along the object under inspection.

FIG. 1 is a perspective view of an example handheld X-ray imaging system 100 to generate and output digital images and/or video based on incident X-rays. The example handheld X-ray imaging system 100 may be used to perform non-destructive testing (NDT), medical scanning, security scanning, and/or any other scanning application.

The system 100 of FIG. 1 includes a frame 102 that holds an X-ray generator 104 and an X-ray detector 106. In the example of FIG. 1, the frame 102 is C-shaped, such that the X-ray generator 104 directs X-ray radiation toward the X-ray detector 106. As described in more detail below, the frame 102 is positionable (e.g., held by an operator, supported by an external support structure and/or manipulated by the operator, etc.) around an object to be scanned with X-rays. The example frame 102 is constructed using carbon fiber and/or machined aluminum.

The X-ray generator 104 is located on a first section 108 of the C-shaped frame 102 generates and outputs X-ray radiation, which traverses and/or scatters based on the state of the object under test. The X-ray detector 106 is located on a second section 110 of the frame 102 (e.g., opposite the first section 108) and receives incident radiation generated by the X-ray generator 104.

The example frame 102 may be manipulated using one or more handles 112, 114. A first one of the handles 112 is an operator control handle, and enables an operator to both mechanically manipulate the frame 102 and control the operation of the handheld X-ray imaging system 100. A second one of the handles 114 is adjustable and may be secured to provide the operator with leverage to manipulate the frame 102. The example handle 114 may be oriented with multiple degrees of freedom and/or adjusted along a length of a center section 116 of the frame 102.

During operation, the handheld X-ray imaging system 100 generates digital images (e.g., digital video and/or digital still images) from the X-ray radiation. The handheld X-ray imaging system 100 may store the digital images on one or more storage devices, display the digital images on a display device 118, and/or transmit the digital images to a remote receiver. The example display device 118 is attachable to the example frame 102 and/or may be oriented for viewing by the operator. The display device 118 may also be detached from the frame 102. When detached, the display device 118 receives the digital images (e.g., still images and/or video) via a wireless data connection. When attached, the display device 118 may receive the digital images via a wired connection and/or a wireless connection.

A power supply 120, such as a detachable battery, is attached to the frame 102 and provides power to the X-ray generator 104, the X-ray detector 106, and/or other circuitry of the handheld X-ray imaging system 100. An example power supply 120 that may be used is a lithium-ion battery pack. The display device 118 may receive power from the power supply 120 and/or from another power source such as an internal battery of the display device 118.

The example center section 116 of the frame 102 is coupled to the first section 108 via a joint 122 and to the second section 110 via a joint 124. The example joints 122, 124 are hollow to facilitate routing of cabling between the sections 108, 110, 116. The joints 122, 124 enable the first section 108 and the second section 110 to be folded toward the center section to further improve the compactness of the handheld X-ray imaging system 100 when not in use (e.g., during storage and/or travel).

Figure 2A:
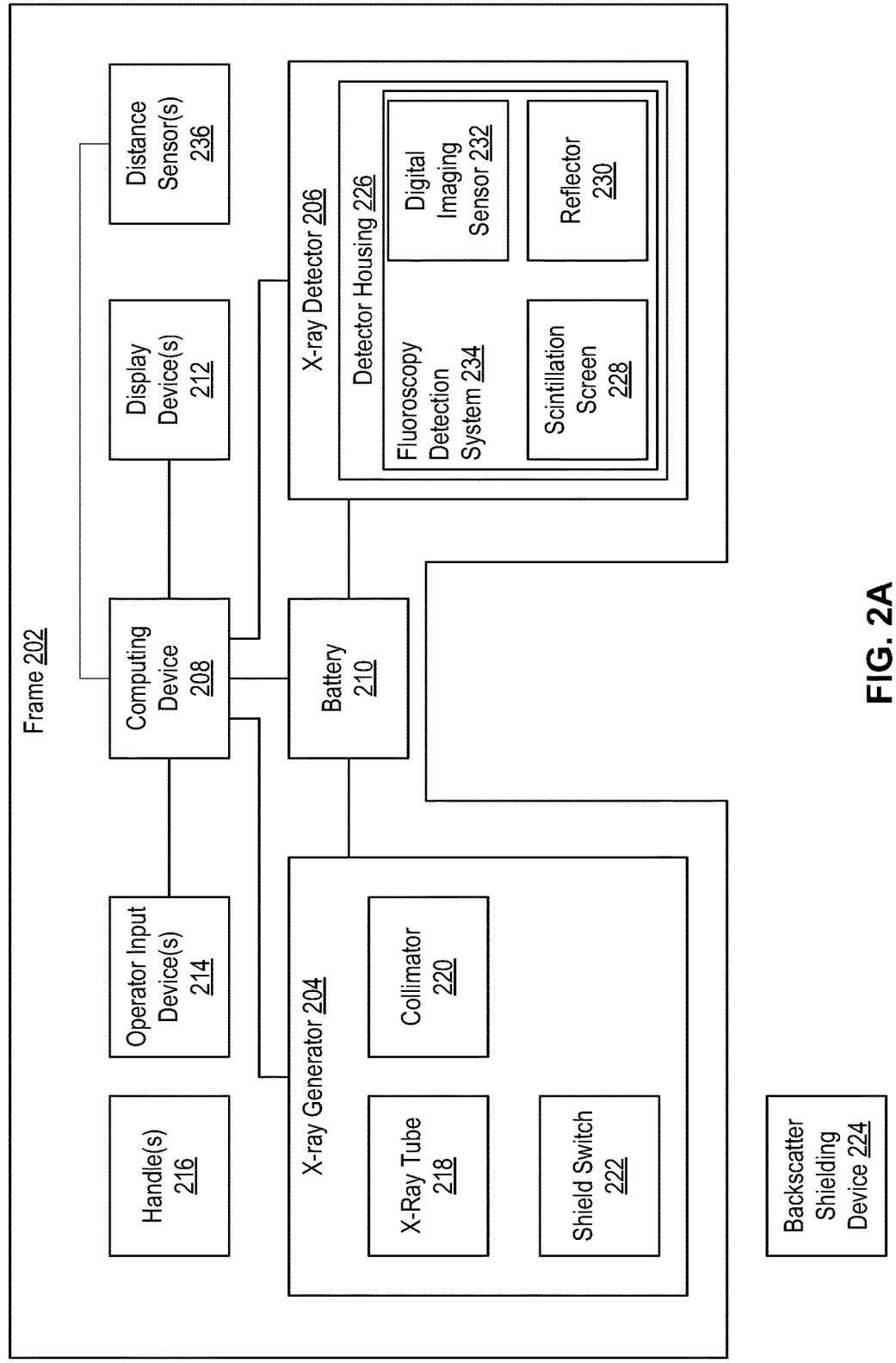
FIG. 2A is a block diagram of the example handheld X-ray imaging system of FIG. 1.

FIG. 2A is a block diagram of an example digital X-ray imaging system 200 that may be used to implement the handheld X-ray imaging system 100 of FIG. 1. The example digital X-ray imaging system 200 of FIG. 2A includes a frame 202 holding an X-ray generator 204, an X-ray detector 206, a computing device 208, a battery 210, one or more display device(s) 212, one or more operator input device(s) 214, and one or more handle(s) 216.

The X-ray generator 204 includes an X-ray tube 218, a collimator 220, and a shield switch 222. The X-ray tube 218 generates X-rays when energized. In some examples, the X-ray tube 218 operates at voltages between 40 kV and 120 kV. In combination with a shielding device, X-ray tube voltages between 70 kV and 120 kV may be used while staying within acceptable X-ray dosage limits for the operator. Other voltage ranges may also be used.

The collimator 220 filters the X-ray radiation output by the X-ray tube 218 to more narrowly direct the X-ray radiation at the X-ray detector 206 and any intervening objects. The collimator 220 reduces the X-ray dose to the operator of the system 200, reduces undesired X-ray energies to the detector 206 resulting from X-ray scattering, and/or improves the resulting digital image generated at the X-ray detector 206.

The shield switch 222 selectively enables and/or disables the X-ray tube 218 based on whether a backscatter shielding device 224 is attached to the frame. The backscatter shielding device 224 reduces the dose to the operator holding the frame 202 by providing shielding between the collimator 220 and an object under test. The example backscatter shielding device 224 includes a switch trigger configured to trigger the shield switch 222 when properly installed. For example, the shield switch 222 may be a reed switch or similar magnetically-triggered switch, and the backscatter shielding device 224 includes a magnet. The reed switch and magnet are respectively positioned on the frame 202 and the backscatter shielding device 224 such that the magnet triggers the reed switch when the backscatter shielding device 224 is attached to the frame 202. The shield switch 222 may include any type of a capacitive sensor, an inductive sensor, a magnetic sensor, an optical sensor, and/or any other type of proximity sensor.

The shield switch 222 is configured to disable the X-ray tube 218 when the backscatter shielding device 224 is not installed. The shield switch 222 may be implemented using, for example, hardware circuitry and/or via software executed by the computing device 208. In some examples, the computing device 208 may selectively override the shield switch 222 to permit operation of the X-ray tube 218 when the backscatter shielding device 224 is not installed. The override may be controlled by an administrator or other authorized user.

The X-ray detector 206 of FIG. 2A generates digital images based on incident X-ray radiation (e.g., generated by the X-ray tube 218 and directed toward the X-ray detector 206 by the collimator 220). The example X-ray detector 206 includes a detector housing 226, which holds a scintillation screen 228, a reflector 230, and a digital imaging sensor 232. The scintillation screen 228, the reflector 230, and the digital imaging sensor 232 are components of a fluoroscopy detection system 234. The example fluoroscopy detection system 234 is configured so that the digital imaging sensor 232 (e.g., a camera, a sensor chip, etc.) receives the image indirectly via the scintillation screen 228 and the reflector 230. In other examples, the fluoroscopy detection system 234 includes a sensor panel (e.g., a CCD panel, a CMOS panel, etc.) configured to receive the X-rays directly, and to generate the digital images. An example implementation of the X-ray detector 206 is described below with reference to FIGS. 5-8.

In some other examples, the scintillation screen 228, may be replaced with a solid state panel that is coupled to the scintillation screen 228 and has pixels that correspond to portions of the scintillation screen 228. Example solid state panels may include CMOS X-ray panels and/or CCD X-ray panels.

The computing device 208 controls the X-ray tube 218, receives digital images from the X-ray detector 206 (e.g., from the digital imaging sensor 232) and outputs the digital images to the display device 212. Additionally or alternatively, the computing device 208 may store digital images to a storage device. The computing device 208 may output the digital images as digital video to aid in real-time non-destructive testing and/or store digital still images.

As mentioned above, the computing device 208 may provide the digital images to the display device(s) 212 via a wired connection or a wireless connection. To this end, the computing device 208 includes wireless communication circuitry. For example, the display device(s) 212 may be detachable from the frame 202 and held separately from the frame 202 while the computing device 208 wirelessly transmits the digital images to the display device(s) 212. Additionally or alternatively, the display device(s) 212 may be implemented using a separate display or computing device. The display device(s) 212 may include a smartphone, a tablet computer, a laptop computer, a wireless monitoring device, and/or any other type of display device equipped with wired and/or wireless communications circuitry to communicate with (e.g., receive digital images from) the computing device 208.

The example display device(s) 212 display the X-ray images with the thermal and/or optical images on a display device in real-time (e.g., as the images are generated). In some examples, the display device(s) 212 display a first feed (e.g., the X-ray feed of X-ray images, the thermal feed of thermal images, or the optical feed of optical images) as primary images having a first (e.g., largest) size, and display a second feed (e.g., another of the X-ray feed of X-ray images, the thermal feed of thermal images, or the optical feed of optical images) as secondary images having a second (e.g., smaller) size. For example, the primary images may be the main display shown on the display device(s) 212, with the secondary images shown in or near a corner of the main display so as to limit obstruction of the main display. In some such examples, the display device(s) 212 further display another secondary feed (e.g., having the same size as the other secondary feed) or a tertiary feed (e.g., having an even smaller size than the secondary feed). In some examples, the two or three feeds have equivalent sizes on the display device(s) 212. The operator may be permitted to select a secondary or tertiary feed to change that feed to be the primary feed, in which case the former primary feed may be relegated to be the secondary or tertiary feed.

In some other examples, the display device(s) 212 may show two or three feeds in an overlapping manner by controlling an opacity of the image(s) in the feeds.

In some examples, the computing device 208 adds data to the digital images to assist in subsequent analysis of the digital images. Example data includes a timestamp, a date stamp, geographic data, or a scanner inclination. The example computing device 208 adds the data to the images by adding metadata to the digital image file(s) and/or by superimposing a visual representation of the data onto a portion of the digital images.

The operator input device(s) 214 enable the operator to configure and/or control the example digital X-ray imaging system 200. For example, the operator input device(s) 214 may provide input to the computing device 208, which controls operation and/or configures the settings of the digital X-ray imaging system 200. Example operator input device(s) 214 include a trigger (e.g., for controlling activation of the X-ray tube 218), buttons, switches, analog joysticks, thumbpads, trackballs, and/or any other type of user input device.

The handle(s) 216 are attached to the frame 202 and enable physical control and manipulation of the frame 202, the X-ray generator 204, and the X-ray detector 206. In some examples, one or more of the operator input device(s) 214 are implemented on the handle(s) 216 to enable a user to both physically manipulate and control operation of the digital X-ray imaging system 200.

The example digital X-ray imaging system 200 further includes one or more sensors 236, which may be used to perform measurements used to calculate sizes of one or more features of the captured digital X-ray images and/or video. Example sensors 236 that may be used include distance sensors configured to determine distances between the X-ray generator 204 and the X-ray detector 206, a distance between the X-ray generator 204 and an exterior surface of an object to be scanned, accelerometers and/or gyroscopes to detect an orientation of the digital X-ray imaging system 200, and/or any other sensors. The sensors 236 may be placed on any appropriate portion of the frame 202 to perform the desired measurements. For example, one or more distance sensors may be placed on a same side of the frame 202 as the X-ray generator 204 to measure distances from the X-ray generator 204 to other objects or locations.

Figure 2B:
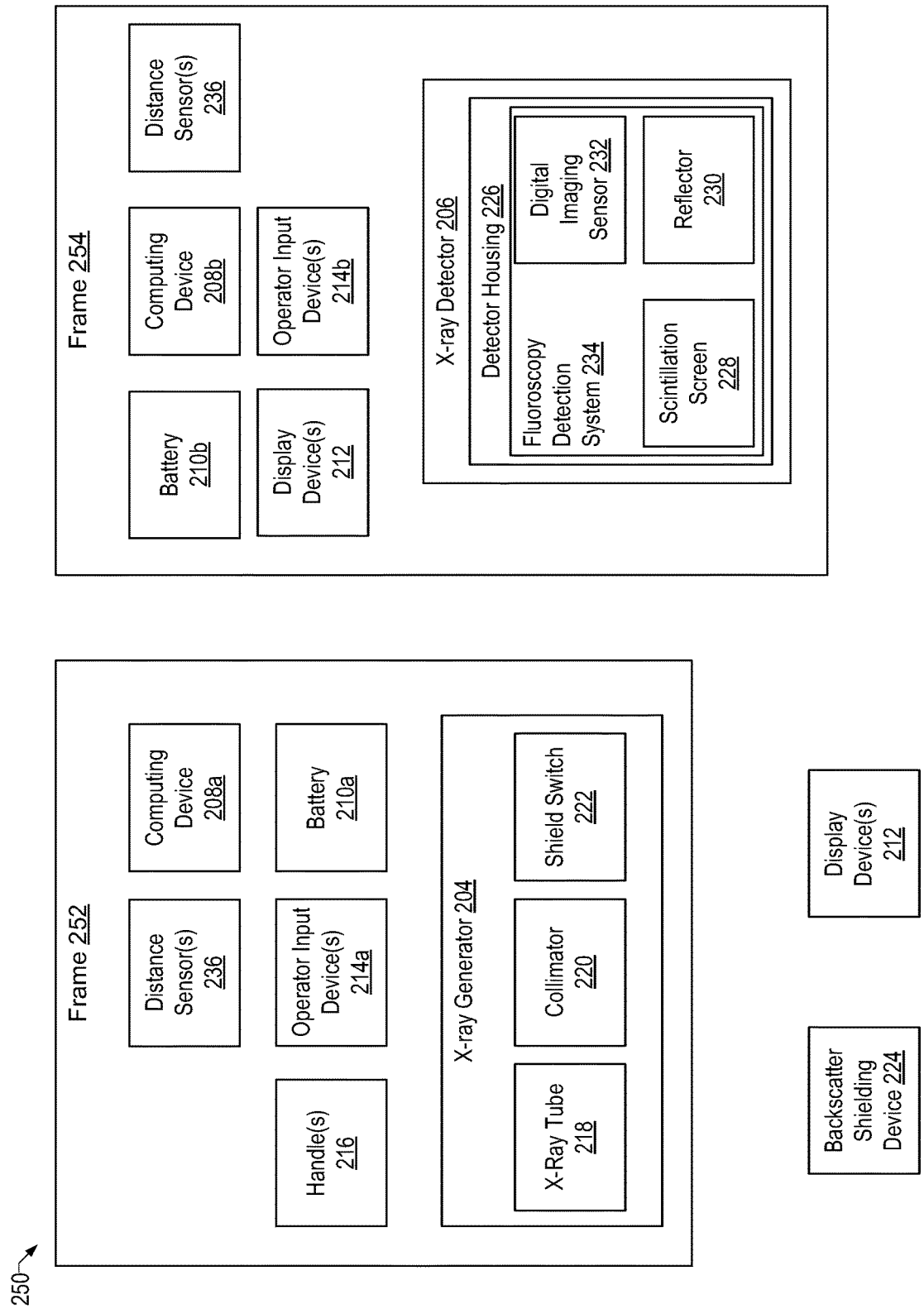
FIG. 2B illustrates another example digital X-ray imaging system having multiple frame sections.

While the example frame 202 includes features to enable the digital X-ray imaging system 200 to be held and manipulated by an operator during output of the X-rays, in other examples the frame 202 includes one or more sections or portions, and/or may be implemented and/or held by one or more robotic device(s), drone aircraft (e.g., quadcopters or other remote-controlled and stable aircraft), and/or other movable support structures. FIG. 2B illustrates another example digital X-ray imaging system 250 having multiple frame sections 252, 254. For example, a first frame section 252 may hold the X-ray generator 204, and the sensor(s) 236, and a second, separate frame section 254 may hold the X-ray detector 206. The frame sections 252, 254 can be separately maneuvered and positioned so that the X-ray radiation is directed from the X-ray generator 204 at the X-ray detector 206 at the time of operation. Additionally, the frame sections 252, 254 may include corresponding power sources (e.g., batteries 210a, 210b), separate computing devices 208a, 208b or other processing and/or communication circuitry, and/or separate operator input device(s) 214a, 214b.

In some examples, all or some of the processing performed by the computing device 208 may be performed by an external computing device. For example, images, metadata, location information, and/or other data may be transmitted to an external computing device, computing network, cloud computing system, and/or any other computing device external to the frame 202 or the frame sections 252, 254.

Figure 3:
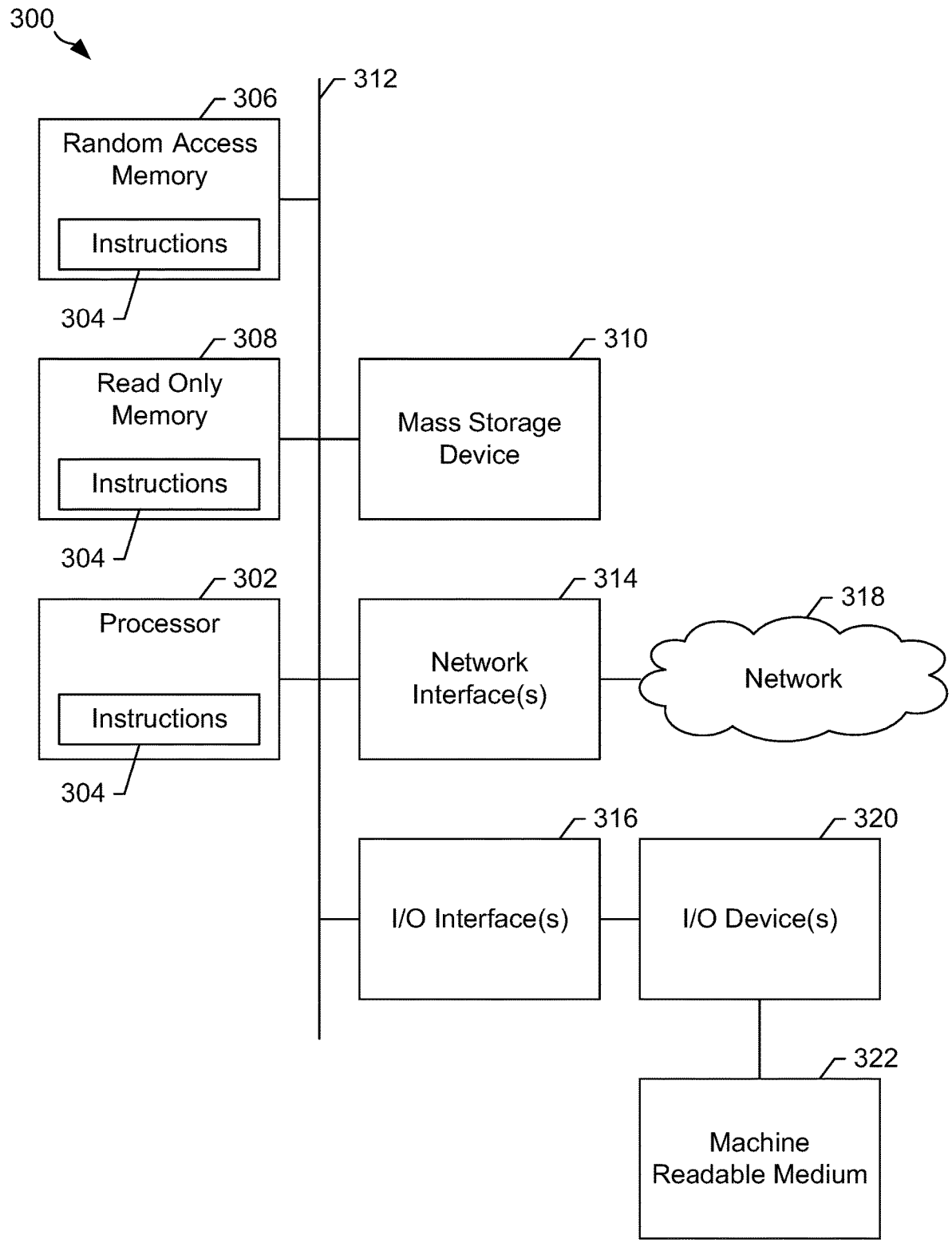
FIG. 3 is a block diagram of an example computing system that may be used to implement the computing device and/or the display devices of FIG. 2A or 2B.

FIG. 3 is a block diagram of an example computing system 300 that may be used to implement either or both of the computing devices 208, 208a, 208b and/or the display device(s) 212 of FIGS. 2A and/or 2B. The example computing system 300 may be implemented using a personal computer, a server, a smartphone, a laptop computer, a workstation, a tablet computer, and/or any other type of computing device.

The example computing system 300 of FIG. 3 includes a processor 302. The example processor 302 may be any general purpose central processing unit (CPU) from any manufacturer. In some other examples, the processor 302 may include one or more specialized processing units, such as RISC processors with an ARM core, graphic processing units, digital signal processors, and/or system-on-chips (SoC). The processor 302 executes machine readable instructions 304 that may be stored locally at the processor (e.g., in an included cache or SoC), in a random access memory 306 (or other volatile memory), in a read only memory 308 (or other non-volatile memory such as FLASH memory), and/or in a mass storage device 310. The example mass storage device 310 may be a hard drive, a solid state storage drive, a hybrid drive, a RAID array, and/or any other mass data storage device.

A bus 312 enables communications between the processor 302, the RAM 306, the ROM 308, the mass storage device 310, a network interface 314, and/or an input/output interface 316.

The example network interface 314 includes hardware, firmware, and/or software to connect the computing system 300 to a communications network 318 such as the Internet. For example, the network interface 314 may include IEEE 802.X-compliant wireless and/or wired communications hardware for transmitting and/or receiving communications.

The example I/O interface 316 of FIG. 3 includes hardware, firmware, and/or software to connect one or more input/output devices 320 to the processor 302 for providing input to the processor 302 and/or providing output from the processor 302. For example, the I/O interface 316 may include a graphics processing unit for interfacing with a display device, a universal serial bus port for interfacing with one or more USB-compliant devices, a FireWire, a field bus, and/or any other type of interface. Example I/O device(s) 320 may include a keyboard, a keypad, a mouse, a trackball, a pointing device, a microphone, an audio speaker, an optical media drive, a multi-touch touch screen, a gesture recognition interface, a display device (e.g., the display device(s) 118, 212) a magnetic media drive, and/or any other type of input and/or output device.

The example computing system 300 may access a non-transitory machine readable medium 322 via the I/O interface 316 and/or the I/O device(s) 320. Examples of the machine readable medium 322 of FIG. 3 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Example wireless interfaces, protocols, and/or standards that may be supported and/or used by the network interface(s) 314 and/or the I/O interface(s) 316, such as to communicate with the display device(s) 118, 212 include wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+ (e.g., GSM/GPRS/EDGE, and IS-95 or cdmaOne) and/or 2G/2G+ (e.g., CDMA2000, UMTS, and HSPA); 4G standards, such as WiMAX (IEEE 802.16) and LTE; Ultra-Wideband (UWB); etc. Example wired interfaces, protocols, and/or standards that may be supported and/or used by the network interface(s) 314 and/or the I/O interface(s) 316, such as to communicate with the display device(s) 118, 212, include comprise Ethernet (IEEE 802.3), Fiber Distributed Data Interface (FDDI), Integrated Services Digital Network (ISDN), cable television and/or internet (ATSC, DVB-C, DOCSIS), Universal Serial Bus (USB) based interfaces, etc.

The processor 302, the network interface(s) 314, and/or the I/O interface(s) 316, and/or the display devices 118, 212, may perform signal processing operations such as, for example, filtering, amplification, analog-to-digital conversion and/or digital-to-analog conversion, up-conversion/down-conversion of baseband signals, encoding/decoding, encryption/decryption, modulation/demodulation, and/or any other appropriate signal processing.

The computing device 208 and/or the display device 212 may use one or more antennas for wireless communications and/or one or more wired port(s) for wired communications. The antenna(s) may be any type of antenna (e.g., directional antennas, omnidirectional antennas, multi-input multi-output (MIMO) antennas, etc.) suited for the frequencies, power levels, diversity, and/or other parameters required for the wireless interfaces and/or protocols used to communicate. The port(s) may include any type of connectors suited for the communications over wired interfaces/protocols supported by the computing device 208 and/or the display device 212. For example, the port(s) may include an Ethernet over twisted pair port, a USB port, an HDMI port, a passive optical network (PON) port, and/or any other suitable port for interfacing with a wired or optical cable.

Figure 4:
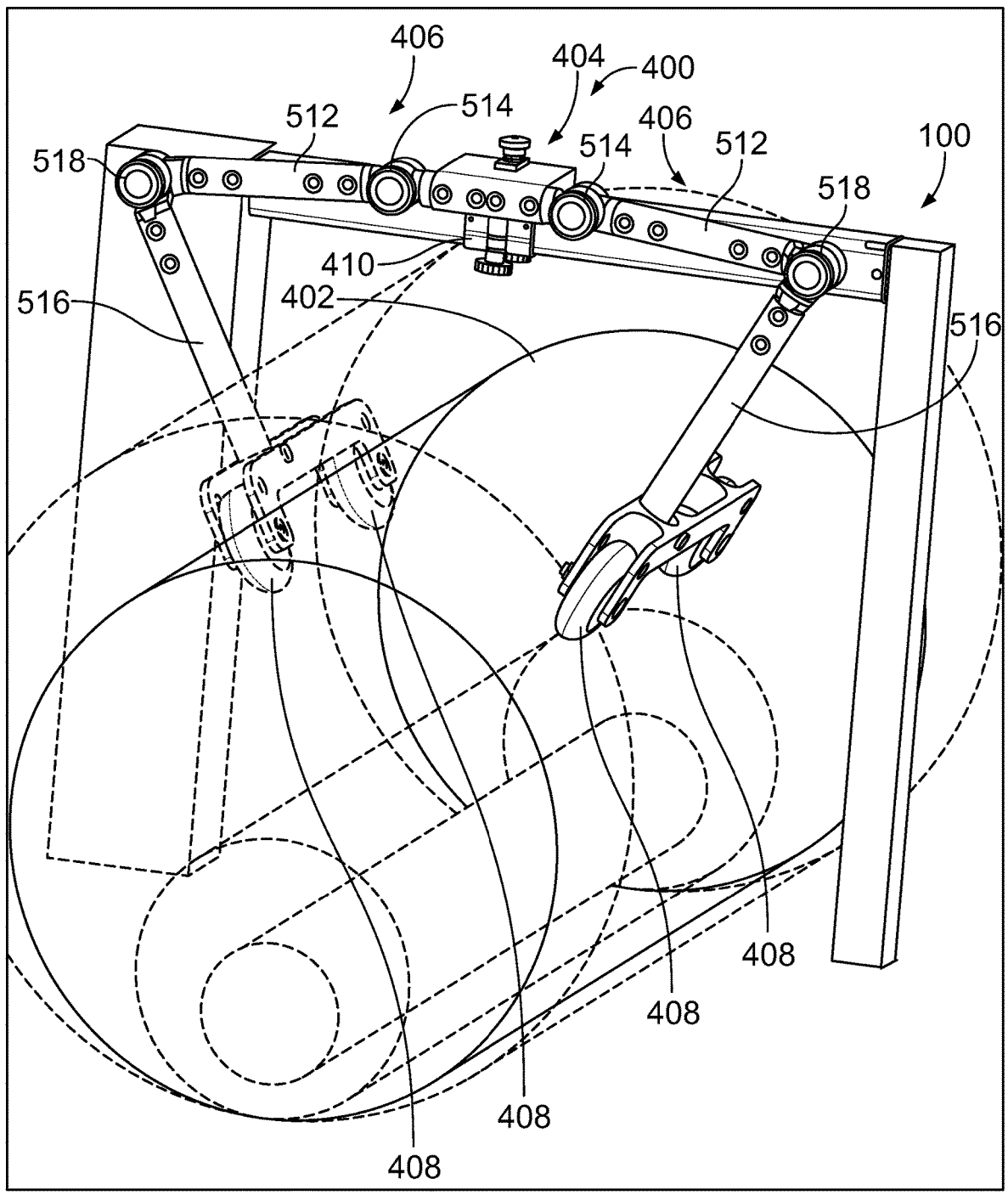
FIG. 4 illustrates an example image stabilizer that may be used in conjunction with the handheld X-ray imaging system to stabilize radiography images and/or video, in accordance with aspects of this disclosure.

FIG. 4 illustrates an example image stabilizer 400 that may be used in conjunction with the handheld X-ray imaging system 100 of FIGS. 1-3 to stabilize radiography images and/or video. The image stabilizer 400 of FIG. 4 is attached to, for example, a center section of a C-arm frame of the X-ray imaging system 100 and is placed into contact with an object 402 (e.g., a pipe, a pipe-under-insulation, or other object for scanning by accessing opposing sides of the object 402).

The example image stabilizer 400 of FIG. 4 includes an attachment bracket 404, legs 406 coupled to the attachment bracket 404, and low-friction contact surfaces 408 coupled to the legs 406.

The example attachment bracket 404 attaches to the center section 116 of the frame 102 of FIG. 1. In the example of FIG. 4, center section 116 includes a Picatinny rail 410 to which the attachment bracket 404 can attach. In other examples, the attachment bracket 404 may include a clamp, bracket, retention pin, and/or any other device to attach the attachment bracket 404 to the frame 102. The location of the attachment bracket 404 may be adjustable along a length of the Picatinny rail or otherwise along the length of the center section 116.

Figure 5:
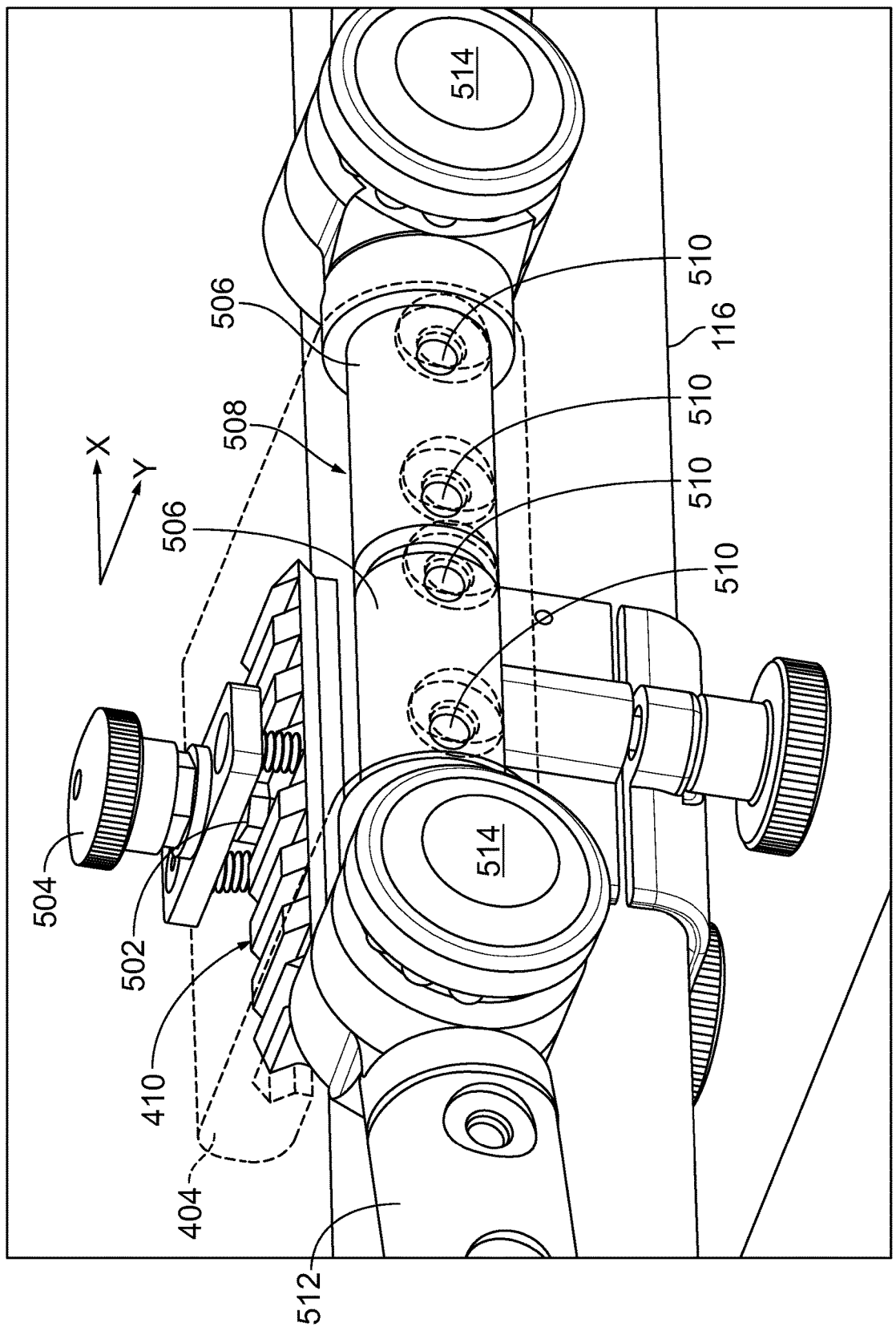
FIG. 5 is a more detailed view of the example attachment bracket of FIG. 4 coupled to the handheld X-ray imaging system.
Figure 6A:
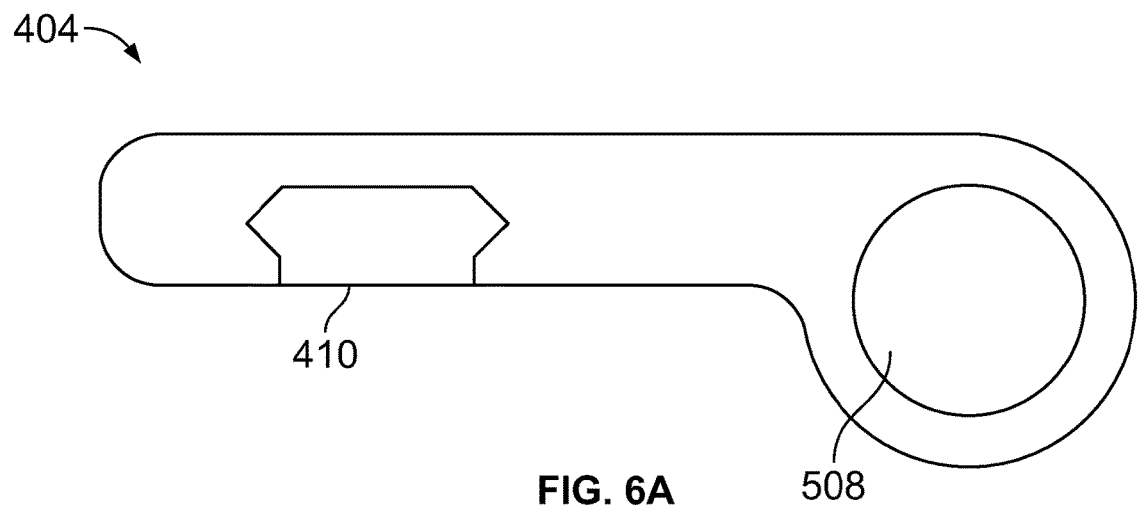
FIG. 6A is a front elevation view of an example attachment bracket which may be used to implement the attachment bracket of FIG. 4.

FIG. 5 is a more detailed view of the example attachment bracket 404 of FIG. 4 coupled to the handheld X-ray imaging system 100. In particular, the attachment bracket 404 extends from the center section 116 of the X-ray imaging system 100 in a direction (e.g., direction Y) different than the direction (e.g., direction X) in which the X-ray imaging system 100 is configured to direct X-rays for radiography. For example, the attachment bracket 404 positions the image stabilizer 400 out of the general plane of the C-arm of the X-ray imaging system 100 to avoid physical and/or radiographic interference between the image stabilizer 400 and the X-ray imaging system 100 during positioning and use. FIG. 6A is a front elevation view of the example attachment bracket 404.

As shown in FIG. 5, the Picatinny rail 410 is attached to the center section 116 of the frame 102. For example, the Picatinny rail 410 may include two C-shaped components which are screwed together with screws to clamp the Picatinny rail 410 onto the frame 102. The screws may be loosened to allow adjustment of the location of the Picatinny rail 410 (and, therefore, the attachment bracket 404) along the frame 102.

The attachment bracket 404 slides onto the Picatinny rail 410, and is secured at a location along the Picatinny rail 410 via an adjustment pin 502. In the example of FIG. 5, the adjustment pin 502 locks the attachment bracket 404 into a position along a length of the rail 410, but can be disengaged by unscrewing, pulling, or otherwise disengaging the adjustment pin 502 via an adjustment knob 504. In some examples, the adjustment pin 502 is biased into engagement with the rail 410. In other examples, the adjustment knob 504 may be screwed, pushed, or otherwise manipulated to engage the rail 410 when the attachment bracket 404 is in the desired position.

The attachment bracket 404 is coupled to the legs 406 via insertion of a first segment 506 of each of the legs 406 into a bore 508 of the attachment bracket 404. The attachment bracket 404 may use a channel, groove, connector, or other method to attach the legs 406 to the attachment bracket 404. In the example of FIG. 5, the bore 508 and the legs 406 include one or more sets of alignment holes 510 to provide for easy alignment and/or balancing of the legs 406 into predetermined orientations in the bore 508. For example, screws, pins, or other alignment devices may be inserted through the alignment holes 510 in the bore 508 and the legs 406 to easily and repeatably align the legs 406 with respect to the handheld X-ray imaging system 100 (e.g., to avoid unintentional interference between the image stabilizer 400 and radiation by the imaging system 100).

Figure 6B:
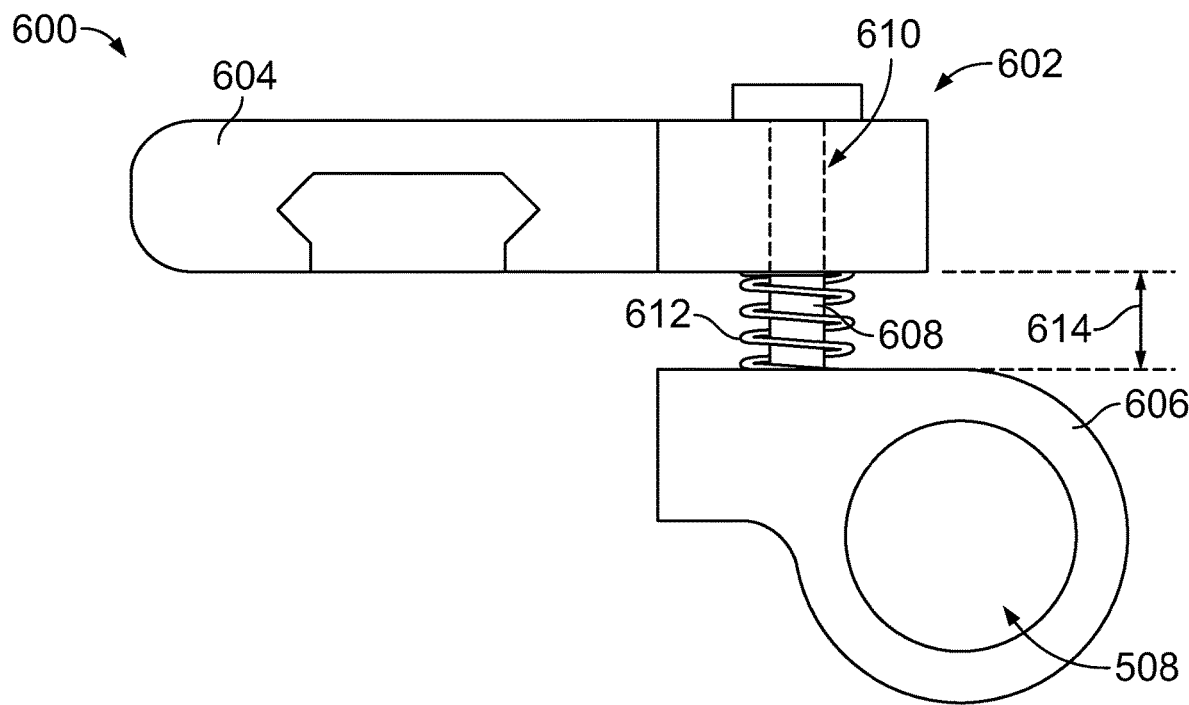
FIG. 6B is a front elevation view of another example attachment bracket, including a height suspension, which may be used to implement the attachment bracket of FIG. 4.

FIG. 6B is a front elevation view of another example attachment bracket 600, including a height suspension 602, which may be used to implement the attachment bracket 404 of FIG. 4. The example attachment bracket 600 of FIG. 6B includes a first segment 604 that attaches to the center section 116 of the frame 102, such as the Picatinny rail 410, in a manner similar or identical to the attachment bracket 404 of FIG. 6A.

The attachment bracket 600 further includes a second segment 606, which is connected to the legs 406. The second segment 606 may include the bore 508 having the alignment holes 510 in a manner similar or identical to the attachment bracket 404 of FIG. 5.

The first segment 604 and the second segment 606 are coupled by the height suspension 602 to allow the height of the attachment bracket (and, therefore, the imaging system 100) to be adjusted with respect to the object 402 with the application of force. The example height suspension includes a bolt 608, which extends through a bore 610 in the first segment 604 and connects to the second segment 606. A biasing element 612, such as a spring, is positioned between the first segment 604 and the second segment 606 and around the bolt 608. The biasing element 612 biases the first segment 604 away from the second segment 606.

However, the operator may easily adjust the height within a distance range 614 by pushing the imaging system 100 toward the object 402. In response to a force on the first segment 604 toward the second segment 606, the bore 610 of the first segment 604 slides along the bolt 608 until the applied force matches the biasing force of the biasing element 612 or a stopping point is reached (e.g., the biasing element 612 is completely compressed, the first segment 604 contacts the second segment 606, etc.). Because the second segment 606 has a fixed height with respect to the object 402 due to the configuration of the legs 406, the adjustment of the height of the first segment 604 with respect to the second segment 606 also adjusts the height of the imaging system 100 with respect to the object 402.

In some examples, the first segment 604 includes a height lock 616 to lock a height of the first segment 604 and the central section 116 with respect to the second segment 606 and the legs 406. For example, the height lock 416 may include a locking pin, a set screw, and/or any other type of clamp or locking device.

Figure 6C:
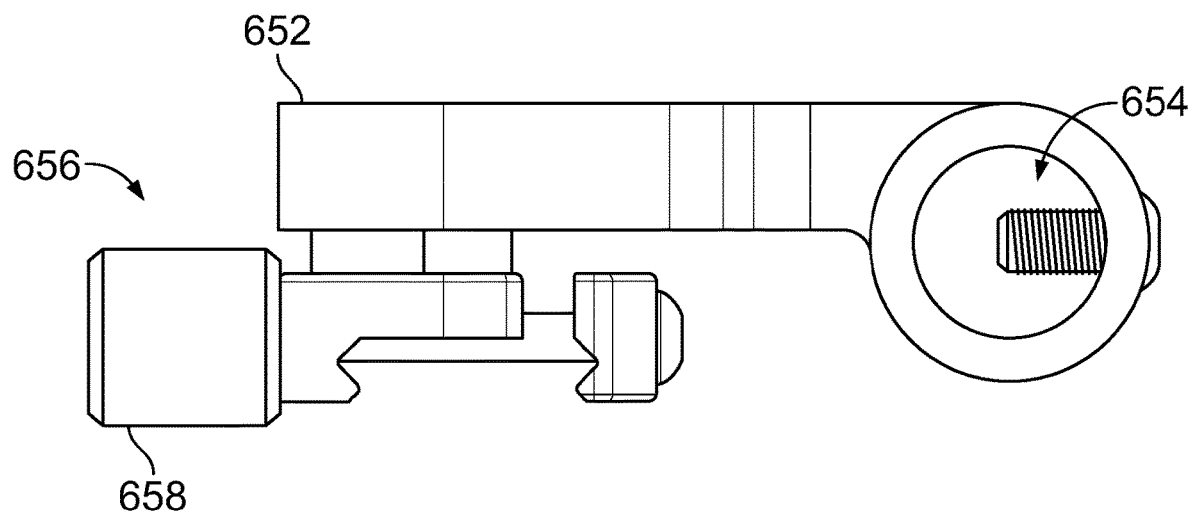
FIGS. 6C, 6D, and 6E illustrate another example attachment bracket, which may be used to implement the attachment bracket of FIG. 4 to attach the center section of the frame to the legs.
Figure 6D:
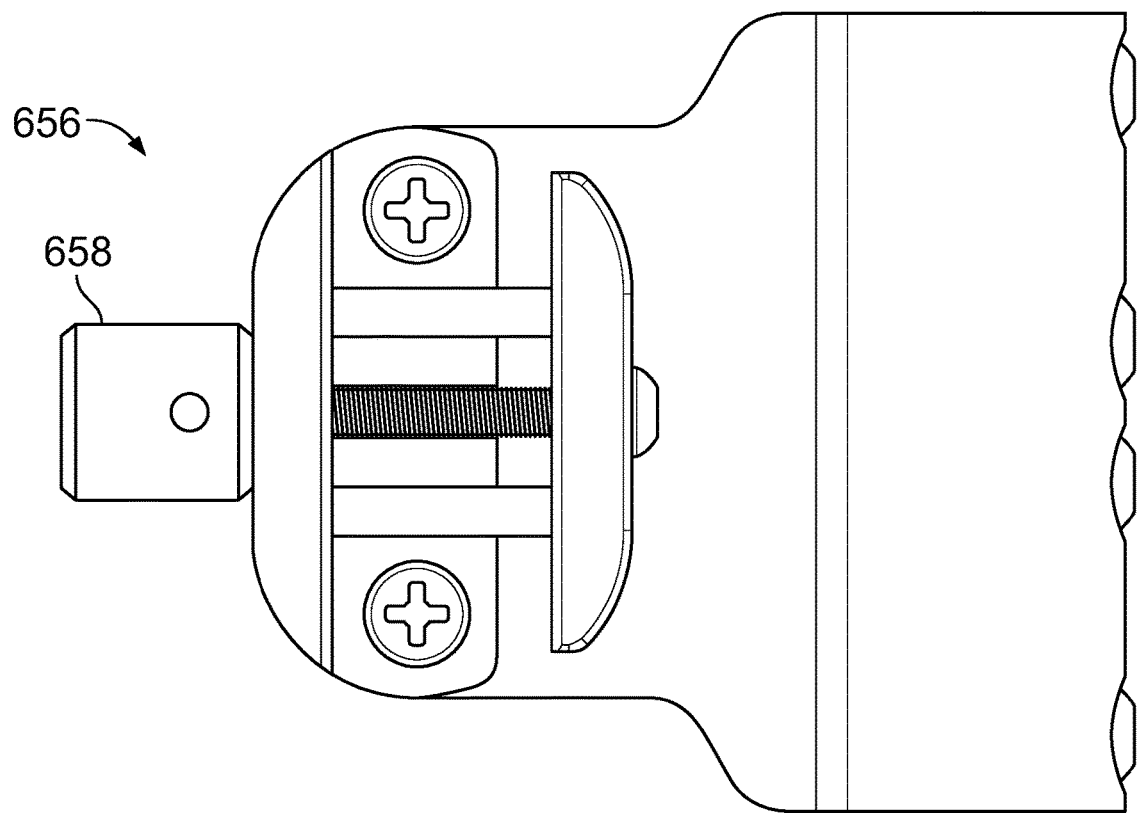
Figure 6E:
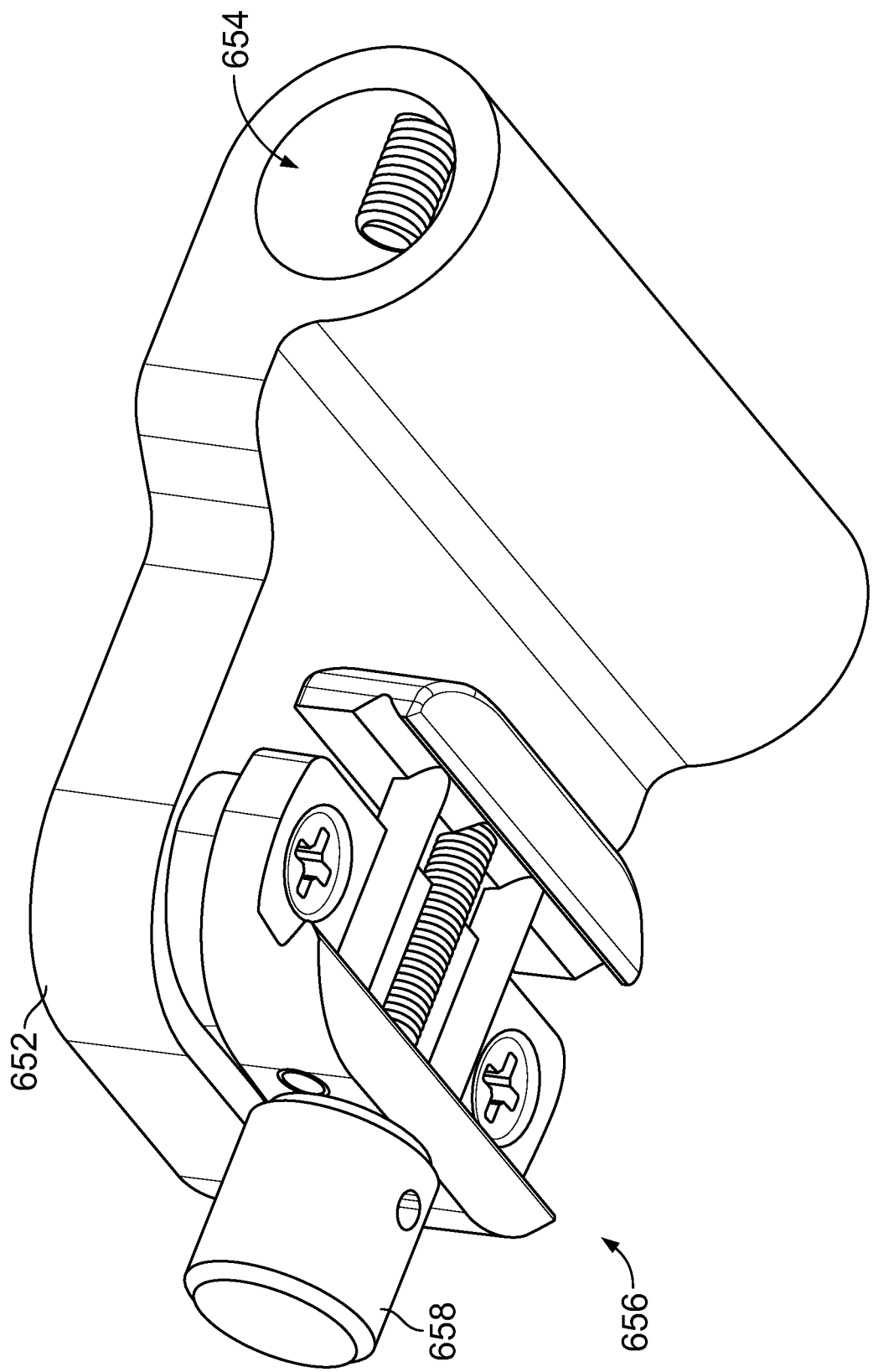

FIGS. 6C-6E illustrate another example attachment bracket 650, which may be used to implement the attachment bracket 404 to attach the center section 116 of the frame 102 to the legs 406. The example attachment bracket 650 includes a first segment 652 having a bore 654. The bore 654 includes the alignment holes 510 in a manner similar or identical to the attachment bracket 404 of FIG. 5, through which bolts or other connectors may align and/or fasten the attachment bracket 650 to the legs 406.

The first segment 652 is rigidly coupled to a Picatinny connector 656 (e.g., a clamp). The Picatinny connector 656 may be secured at a desired location along the length of the Picatinny rail 410 to attach the imaging system 100 to the image stabilizer 400. A knob 658 or other adjustment device may fasten or loosen the connection between the Picatinny connector 656 and the Picatinny rail 410.

Similarly to the attachment brackets 404 and 600, the attachment bracket 650 extends from the center section 116 of the X-ray imaging system 100 in a direction (e.g., direction Y) different than the direction (e.g., direction X) in which the X-ray imaging system 100 is configured to direct X-rays for radiography.

Returning to FIGS. 4 and 5, each of the legs 406 further includes a second segment 512 coupled to the respective first segment 506 via a first pivot joint 514. The first pivot joint 514 allows rotation between the segments 506, 512 in one or more axes, and secures the segments 506, 512 at a configured angle.

Each of the legs 406 also includes a third segment 516 coupled to the respective second segment 512 via a second pivot joint 518. The second pivot joint 518 allows rotation between the segments 512, 516 in one or more axes, and secures the segments 512, 516 at a configured angle. Any of the example segments 506, 512, 516 of the legs 406 may have an adjustable length, such as by including a telescoping joint in the segment. The telescoping joint may be fastened by a telescoping clamp, a button clip and set of holes in the segment 506, 512, 516 corresponding to a set of discrete lengths, and/or using a quick release ball lock pin with a set of holes in the segment 506, 512, 516 corresponding to a set of discrete lengths.

In combination, the segments 506, 512, 516 and the joints 514, 518 allow the height of the imaging system 100 to be adjusted with respect to the object 402 and/or allows the width between the low-friction contact surfaces 408 to be configured for objects having different diameters. For example, the width between the low-friction contact surfaces 408 and/or the height of the imaging system 100 may be configured via the joints 514, 518 and/or the lengths of the segments 506, 512, 516 may be set for a particular pipe (e.g., pipes between 3 inches and 30 inches total outer diameter, including insulation) and for a particular depth of scanning by the imaging system 100.

In the example of FIGS. 4 and 5, the pivot joints 514, 518 of the two (or more) legs 406 are single-axis pivot joints having a screw clamp which can be loosened to allow for rotation and tightened to secure the segments 506, 512 at a given angle. Other types of clamps may be used, such as cam lever clamps.

In some other examples, the pivot joints 514, 518 may be replaced with ball-and-socket joints or any other type of mechanical joint that allows for desired angles of rotation and enables the selected angle to be secured.

Figure 7:
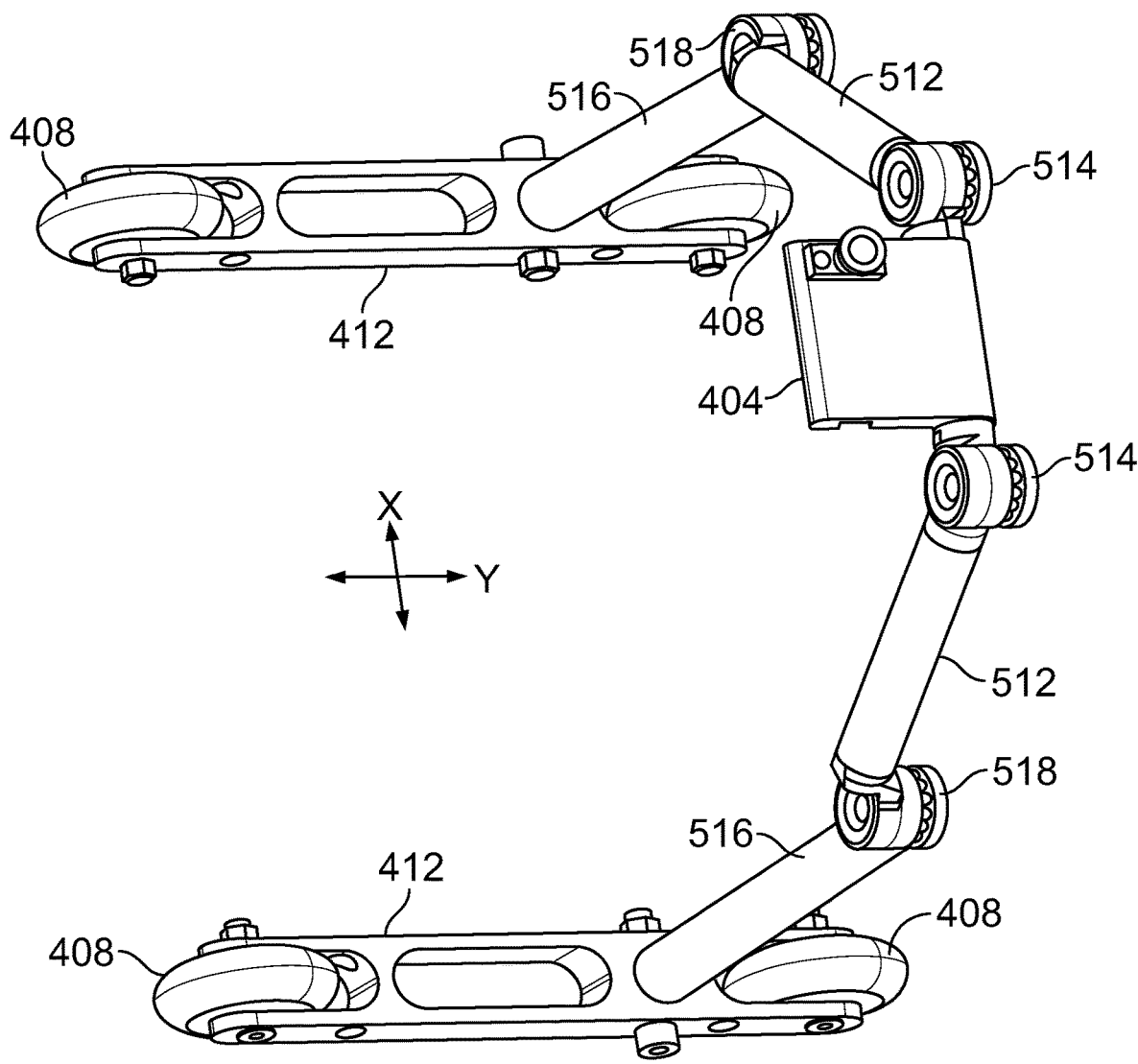
FIG. 7 is a perspective view of the example image stabilizer of FIG. 4.
Figure 8:
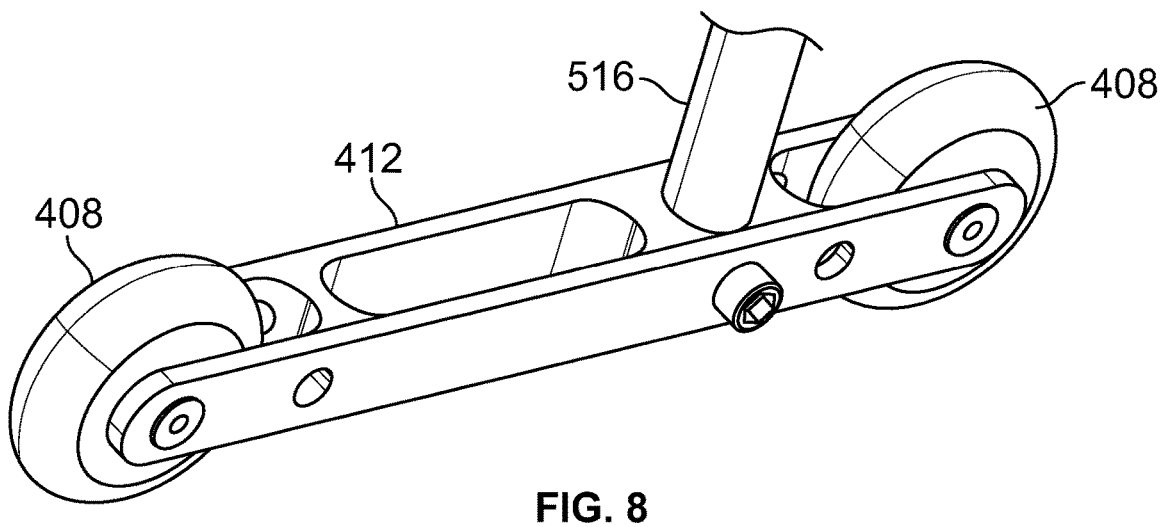
FIG. 8 is a more detailed view of the example hubs of FIG. 4.

FIG. 7 is a perspective view of the example image stabilizer 400 of FIG. 4. In the example of FIGS. 4 and 7, the low-friction contact surfaces 408 are wheels which rotate linearly. The legs 406 are coupled to the low-friction contact surfaces 408 via respective hubs 412. FIG. 8 is a more detailed view of the example hubs 412 of FIG. 4.

The hubs 412 are coupled to the final segments 516 of the legs 406, and extend laterally with respect to the plane of the legs and/or the plane of the imaging system 100. The hubs 412 may be bolted or otherwise fastened to the legs 406. The example hubs 412 space the low-friction contact surfaces 408 on either side of the imaging system 100 in the Y direction and the low-friction contact surfaces 408 permit travel in the Y direction, while the imaging system 100 projects X-rays in the X direction.

Figure 9:
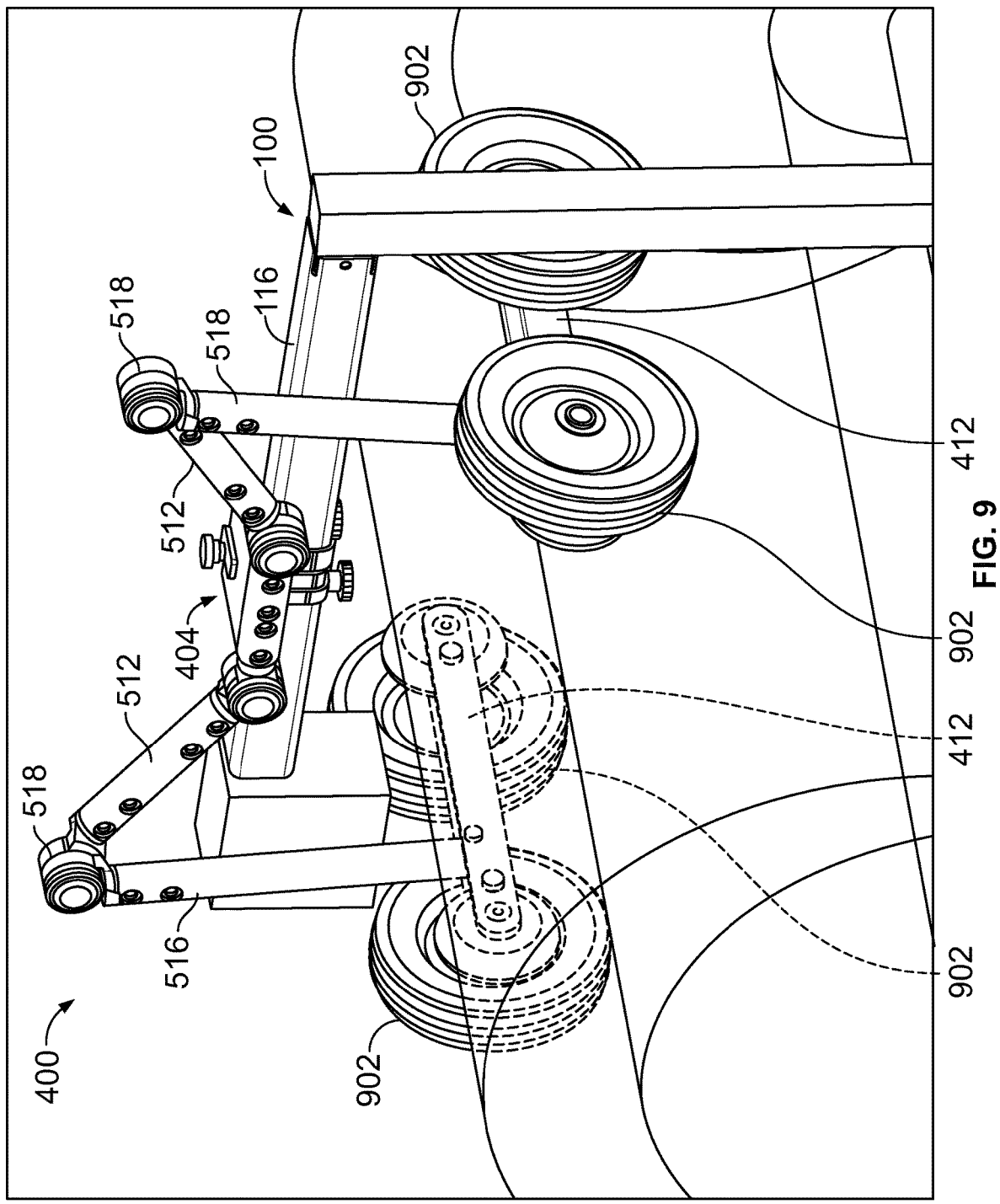
FIG. 9 illustrates the example image stabilizer of FIG. 4 in another arrangement of the legs.

While the example low-friction contact surfaces 408 are wheels, other types of low-friction contact surfaces may be used, such as casters (swiveling or fixed casters), gliding surfaces, rollers, bearings (e.g., surfaces that can rotate in a primary direction and/or any other direction, such as circumferentially), and/or any other type of low-friction contact surface. The hubs 412 may be configured to attach multiple different types of low-friction contact surfaces 408 (e.g., wheels and casters, wheels and gliding surfaces, etc.) and/or multiple different sizes of low-friction contact surfaces 408 (e.g., wheels of different sizes). For example, the wheels illustrated in FIG. 8 are coupled between parallel surfaces of the hub 412 using a first type of axle, such as an axle bolt and nut. FIG. 9 illustrates the example image stabilizer of FIG. 4 in another arrangement of the legs 406, in which larger wheels 902 are coupled to an outside surface of the hubs 412 instead of between parallel surfaces. The larger wheels 902 are coupled using a second type or length of axle, such as a longer axle bolt and nut.

In the example of FIGS. 4, 7, and 8, there are four wheels (or other low-friction contact surface) distributed between the two hubs 412. At least two of the wheels are positioned on each side of the imaging system 100 to provide support against lateral rotation. In examples in which there are three wheels (or other low-friction contact surface), at least two of the wheels are positioned on a first lateral side of the imaging system 100 and the third one of the wheels is positioned on the second lateral side to provide support against lateral rotation.

Figure 10:
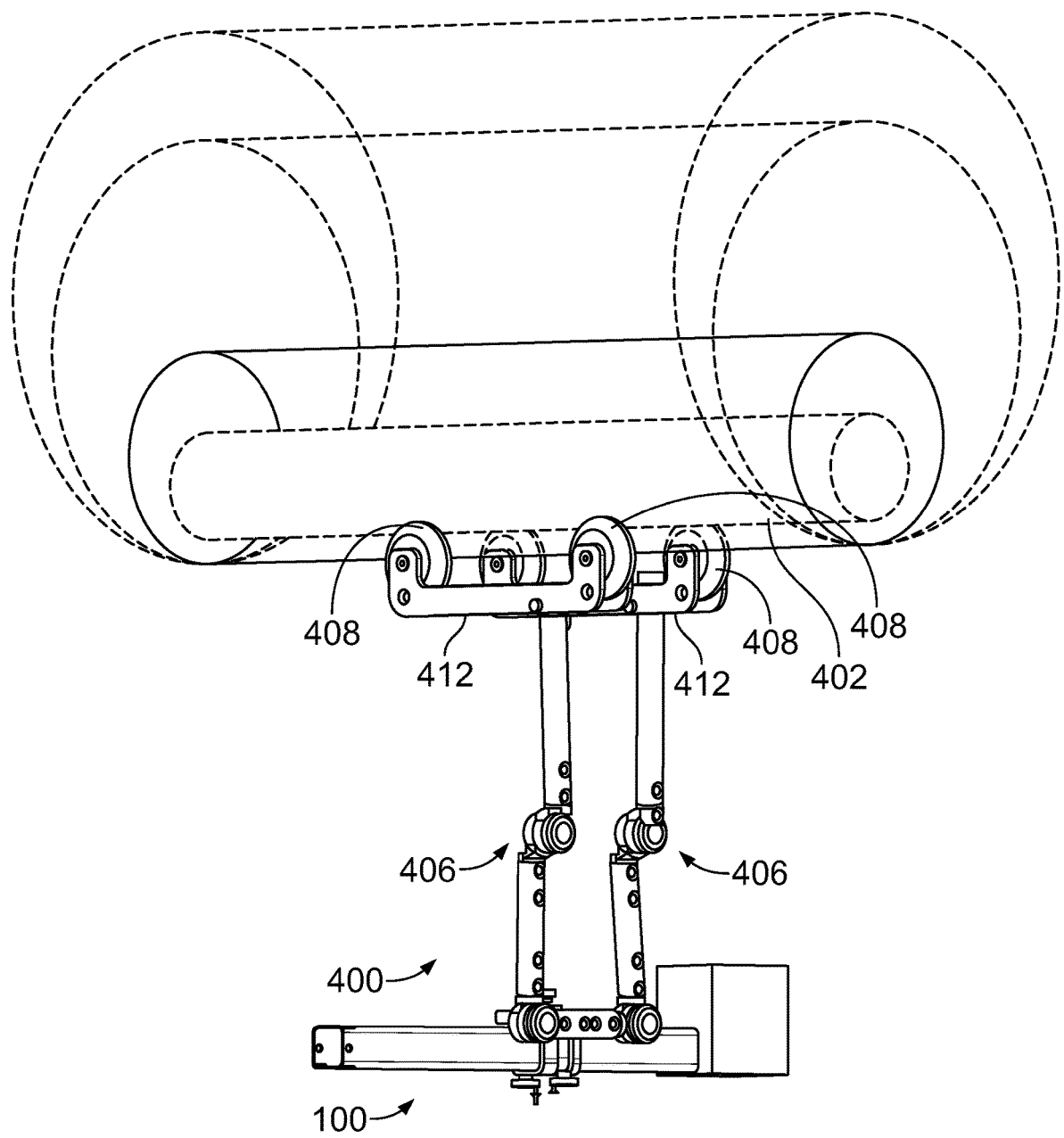
FIG. 10 illustrates the example image stabilizer of FIG. 4 in another arrangement of the legs, in which the handheld X-ray imaging system is positioned to scan an insulated pipe from below.
Figure 11:
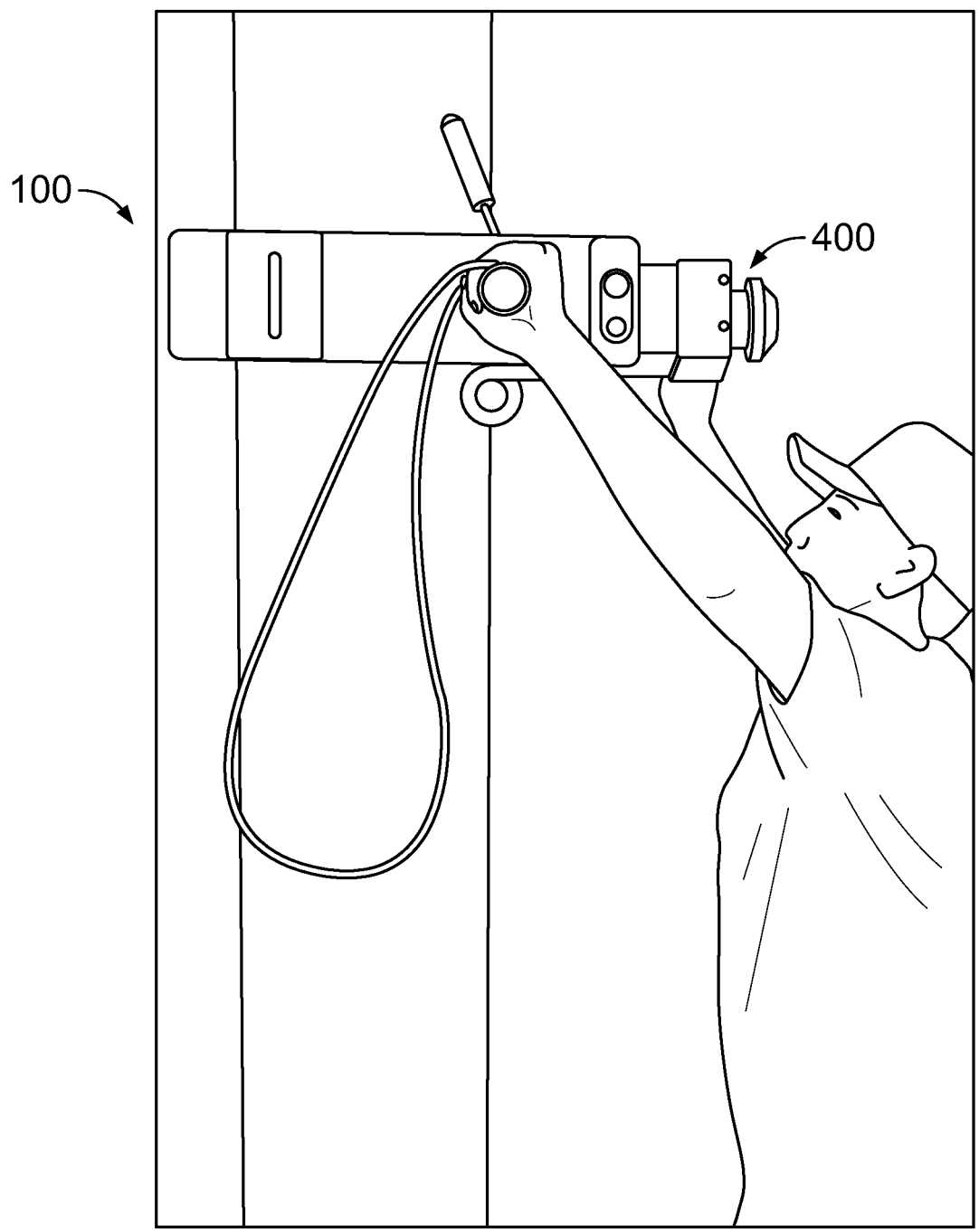
FIG. 11 illustrates the example image stabilizer of FIG. 4 in an example scanning operation while the image stabilizer is held by an operator against an insulated pipe for a vertical travel direction.

FIG. 10 illustrates the example image stabilizer 400 of FIG. 4 in another arrangement of the legs 406, in which the handheld X-ray imaging system 100 is positioned to scan an insulated pipe 1000 from below. FIG. 11 illustrates the example image stabilizer of FIG. 4 in an example scanning operation while the image stabilizer 400 is held by an operator against an insulated pipe 1100 for a vertical travel direction. Rather than attempt to hold the imaging system 100 stable in lateral directions while moving the imaging system 100 in a scanning direction, the image stabilizer 400 allows the operator to stabilize the imaging system 100 with respect to the insulated pipe 1000, 1100 (or other object under inspection).

While the examples discussed above couple the attachment bracket 404 to the center section 116 of the imaging system 100, the attachment bracket 404 may be coupled to any other structural component of the imaging system 100, such as the first or second sections 108, 110 of the frame 102.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A radiography image stabilizer, comprising:
   an attachment bracket configured to be coupled to a center section of a radiographic imaging device and to extend from the center section of the radiographic imaging device in a first direction different than a direction in which the radiographic imaging device is configured to direct radiation;
   two or more legs attached to the attachment bracket and configured to extend from the attachment bracket at least partially in the directions in which the center section of the radiographic imaging device extends from an attachment point with the attachment bracket; and
   three or more low-friction contact surfaces collectively coupled to the two or more legs, such that at least one contact surface is disposed on each side of the center section, wherein each of the legs comprises at least one pivot point and at least two leg sections coupled by the at least one pivot point to selectively adjust a height of the attachment bracket with respect to the contact surfaces and a width between the contact surfaces.

2. The radiography image stabilizer as defined in claim 1, wherein the two or more legs are pivotally coupled to the attachment bracket.

3. The radiography image stabilizer as defined in claim 1, wherein the pivot point is securable to maintain the width between the low-friction contact surfaces and the height of the attachment bracket with respect to the low-friction contact surfaces.

4. The radiography image stabilizer as defined in claim 1, wherein the attachment bracket is configured to attach to a Picatinny rail.

5. The radiography image stabilizer as defined in claim 1, wherein the three or more low-friction contact surfaces are coupled to the two or more legs via respective hubs attached to the legs.

6. The radiography image stabilizer as defined in claim 5, wherein the hubs are transverse to the direction in which the radiographic imaging device is configured to direct the radiation, to position the contact surfaces on both sides of the radiographic image device.

7. The radiography image stabilizer as defined in claim 5, wherein the hubs are configured to attach at least two different types of low-friction contact surfaces, wheels having at least two different sizes, or at least two different axle diameters.

8. The radiography image stabilizer as defined in claim 1, comprising four or more low-friction contact surfaces, wherein at least two low-friction contact surfaces of the four or more low-friction contact surfaces are on each side of the attachment bracket.

9. The radiography image stabilizer as defined in claim 1, wherein the two or more legs are configured to adjust a width between the low-friction contact surfaces to engage pipes between 3 inches and 30 inches in diameter.

10. The radiography image stabilizer as defined in claim 1, wherein at least one of the leg sections on each of the legs has an adjustable length.

11. The radiography image stabilizer as defined in claim 1, wherein the low-friction contact surfaces comprise at least one of wheels, casters, gliding surfaces, rollers, or bearings.

12. The radiography image stabilizer as defined in claim 1, wherein the attachment bracket comprises a height suspension configured to bias the central section of the radiographic imaging device in a first direction with a suspension force.

13. The radiography image stabilizer as defined in claim 12, wherein the first direction is away from the low-friction surfaces, and the suspension force may be overcome to push the central section towards the low-friction surfaces.

14. The radiography image stabilizer as defined in claim 12, further comprising a height lock configured to lock a height of the central section with respect to the two or more legs.

15. The radiography image stabilizer as defined in claim 1, wherein the attachment bracket is configured to hold the radiography device at a substantially constant distance from the object under inspection while moving the radiography device along the object under inspection.

* * * * *